United States Patent

[11] 3,620,743

[72] Inventor Norman T. Notley
Box 462, Sierre Madre, Calif. 91024

[21] Appl. No. 885,371
[22] Filed Dec. 15, 1969
[45] Patented Nov. 16, 1971

[54] VEHICLES FOR VESICULAR PHOTOGRAPHIC MATERIALS
9 Claims, No Drawings

[52] U.S. Cl. .......... 96/49, 96/75, 96/91 R, 96/115 R
[51] Int. Cl. .......... G03c 5/18, G03c 1/52, G03c 5/00
[50] Field of Search .......... 96/48, 49, 75, 91, 114, 115, 88, 67

[56] References Cited

UNITED STATES PATENTS

| | | | |
|---|---|---|---|
| 2,968,558 | 1/1961 | Clavier et al. | 96/114 |
| 3,457,071 | 7/1969 | Notley et al. | 96/48 X |
| 3,183,091 | 5/1965 | Sporer et al. | 96/48 |
| 3,171,743 | 3/1965 | Peticolas | 96/49 |
| 2,684,341 | 7/1954 | Anspon et al. | 96/75 UX |
| 3,032,414 | 5/1962 | James et al. | 96/75 X |
| 2,852,382 | 9/1958 | Illingsworth et al. | 96/114 X |
| 2,996,381 | 8/1961 | Oster et al. | 96/49 |

FOREIGN PATENTS

| | | | |
|---|---|---|---|
| 725,903 | 6/1969 | Belgium | 96/60 |

*Primary Examiner*—Charles L. Bowers, Jr.

ABSTRACT: This invention is directed to a light-sensitive vesicular-imaging composition comprising an essentially chloroacrylonitrile polymer, including copolymers of chloroacrylonitrile with a different vinyl monomer and intimate mixtures with other organic materials, coated as a thin film and having intimately dispersed therein a sensitizer which liberates gas on irradiation. Upon irradiation of this novel composition with a pattern of actinic radiation, gas released in the selected areas may be developed to a superior image by overall heating.

VEHICLES FOR VESICULAR PHOTOGRAPHIC MATERIALS

It is an object of this invention to provide superior binders for compounds which produce gas upon irradiation, thereby to derive improved transparent and opaque copy materials for copying particularly photographic records and microfilm.

Vesicular images are formed in said materials by small bubbles or vesicles of gas which are formed and trapped in the areas of the film exposed to light and which scatter light. Generally the film has a colloid or a resin coating on a backing material and a light-sensitive agent, most commonly a diazo compound, dispersed throughout the coating. When the film is exposed to actinic light the sensitizer releases molecules of a gas. The coating rheology is arranged so that these do not form vesicles immediately, both because printout systems are less favored than latent image systems and because it makes possible a reversal processing which will be discussed below. The released gas does form bubbles when the film is heated, presumably because the vehicle is relaxed sufficiently on heating for gas nuclei to expand. The resulting vesicles make the vehicle opaque to transmission of light in the exposed areas, but also reflective so that if the coating is made on an opaque substrate, the image appears white. Usually the resulting print is given an overall exposure to light to prevent possible undesirable bubble formation in the clear areas upon subsequent simultaneous exposure to heat and light as in a projector. In reversal processing the latent image is permitted to diffuse out of the film which is then exposed overall to actinic light and developed. As a transparency this processing provides a faithful reproduction of the original, wherein parts of the copy which were exposed imagewise remain clear and the initially unexposed areas are processed to become opaque. A particularly simple and very effective processing for instant access reversal processing is described in the applicant's U.S. Pat. No. 3,457,071 wherein the conventional imaging is followed as soon as desired by an overall exposure to a flash tube.

The earliest vesicular materials employed gelatin as the vehicle. These suffered from the difficulty that the vesicular images obtained faded rapidly. While the gelatin had the low permeability to the blowing gas which is desired, it is unduly sensitive to water vapor. Gelatin vehicles absorbed moisture from the atmosphere and became soft, thus collapsing the vesicle and destroying the image. An improvement in this process was taught in U.S. Pat. No. 2,703,756 wherein the sensitizer containing colloid was encapsulated in a hydrophobic resin such as polystyrene. The same disadvantages of high solvent retention, moisture pickup and poor image stability are encountered although to a lesser degree.

In a further improvement the hydrophilic polymer was replaced completely by a hydrophobic polymer and this was achieved by coating polymer and sensitizer together from the same organic solvent or from a mixture of compatible solvents such as butanone and acetonitrile. The criteria which control the choice of the hydrophobic polymer are very comprehensive and critical. While not confined to the following considerations, the criteria include very low permeability, good rigidity under ambient conditions, a convenient softening temperature at which the polymer is sufficiently mobile to permit vesicles to form but at which the gas permeability is still not excessively high, good solubility and good film-forming characteristics. The monomer vinylidene chloride has been important in the search for a useful binder. While it is not directly useful in itself particularly because the crystalline nature of its polymer does not allow adequate solubility, it apparently is close in many characteristics so that it has emerged as the parent of a family of binders each of which has some merit in a special application, some of these binders have been achieved by introducing comonemers of various types and amounts and by mixing with a nonvinylidene chloride but compatible polymer and often by a combination of copolymerizing and mixing. The most successful binder has apparently been such a combination, wherein the vinylidene chloride is copolymerized with acrylonitrile the copolymer being known as saran, and mixed with polymethylmethacrylate. However this binder is a compromise of the required properties wherein the attainable image density is much reduced by the methacrylate polymer while the rigidity of the vehicle although much improved over saran is not sufficient to hold the image intact at even quite moderate temperatures like 80° C. Furthermore the vinylidene chloride is very hazardous, tending to form peroxides and phosgene in contact with air, giving a mixture which may explode on heating.

It has now been discovered that a less hazardous and entirely superior monomer is chloroacrylonitrile in itself the homopolymer is an adequate vehicle for the development of vesicular images of good quality which are without further treatment quite stable at 80° C. Record furnishing materials of this new art have much higher stability as raw film and in the final image form. Apart from its inherent superiority, further advantages accrue from its ability to be modified subtly by copolymerization and blending to give a family of vehicles for optimum performance in specific application such as conventional or instant access reversal processing or hard-copy-recording materials. The polymerization or copolymerizations may in general be carried out in solution, in emulsion or in suspension and generally with the application of catalysts and heat, the details of which do not form part of the present invention. The blending may be done in a common solvent where appropriate or may be done by mixing compatible solvents. While it is believed that any monomer which will copolymerize with chloroacrylonitrile can be tolerated in the copolymer in some proportion sufficiently small and that the optimum proportion will generally be less than 50 percent by mole ratio, particularly good effects are obtained from copolymerizing with vinyl toluene, acrylonitrile, methyl styrene or styrene.

Although the homopolymer or copolymers without blending have excellent characteristics, a substantial amount of another polymer which is compatible but not otherwise specific can be tolerated generally up to 50 percent by weight and furthermore for special effects particularly for adaptation to unusual processing conditions there are advantages in blending and this has been noted particularly on blending with cellulose acetate, polyalphamethylstyrene, polyvinylidene chloride acrylonitrile copolymer and with polymethylmethacrylate. Butanone is generally a convenient solvent for the polymers and blends discussed. The sensitizer may then be added in a milling type operation or preferably by mixing from a compatible solution. While the specific choice of a sensitizer to liberate gas upon irradiation is not a subject of this invention, it noted that those which liberate nitrogen are particularly effective including the diazonium salts as dimethylaminobenzene diazonium chloride, 4-morpholino benzene diazonium chloride, or diethylaminobenzene diazonium chloride. The addition of acids for the preservation of diazonium salts is well known, and acids such as citric acid or paratoluenesulfonic acid are not injurious in materials of the present invention. Prior art also teaches the addition of inert light-absorbing dyes which will enhance the vesicular image contrast with only a relatively slight increase in background density.

The film support can be any suitable material. If the image-bearing record is to be used as a transparency then polyethylene glycol terephthalate (i.e. Melinex, Mylar, or Celenar polyester), glass, polyethylene or polypropylene may be used directly, cellulose acetate may be used if it is coated with an interlayer to prevent diffusion of plasticizer from the base into the vesicular image-bearing layer and oriented polystyrene if there is an interlayer to prevent attack on the base of solvents used in the coating. Opaque support material may be used where the image is to be viewed by reflection and should be dark in color or black for maximum contrast with the developed vesicles which appear white in reflection. Such materials include metal foil, pigmented plastics or paper.

The following examples illustrate the preparation of vesicular record materials and various methods of use.

SPECIFIC EMBODIMENTS

Example 1

Sixty-six grams alphachloroacrylonitrile monomer were mixed with 33-grams styrene and emulsified using 3-grams sodium lauryl sulfate with 300 cc. of an aqueous solution having dissolved 0.3 percent ammonium persulfate 0.7 percent sodium matabisulfite and 0.25 percent tetrasodium pyrophosphate. After stirring for 12 hours at 65° C., the emulsion was broken by addition of sodium chloride, filtered, washed repeatedly with aqueous methanol and the polymer was dried in an air stream at 70° C. and showed a yield of 59 percent. Example 2

The chloroacrylonitrile/styrene copolymer of example 1 was dissolved to 20 percent in butanone and sufficient dimethylaminobenzene diazonium chloride (zinc chloride salt) was added as a 10 percent solution to make a 1:10 dry ratio of sensitizer to binder. The clear solution of high viscosity was coated on polyester film base from a 4-mil nip and dried with a temperature profile from 70° C. to 115° C. Exposure to ultraviolet light and development for one-half second at 110° C. showed an image with maximum diffuse density = 0.22 and exposure range of 0.6.

Example 3

Fifty grams of alphachloroacrylonitrile and 50-grams vinyltoluene were copolymerized according to the procedures of example 1, sensitized coated and dried according to the procedures of example 2. The image-forming ability was further enhanced by immersion for 30 seconds in boiling water and drying at room temperature. A diffuse density of 0.29 was obtained by exposure to ultraviolet light and development at 110° C.

Example 4

Sixty-six grams chloroacrylonitrile and 33-grams methyl styrene were copolymerized according to the procedure of example 1, sensitized coated and dried according to the procedures of example 2. A diffuse density of 0.69 was obtained by exposure to ultraviolet light and development at 115° C.

Example 5

Fifty parts by weight of chloroacrylonitrile and 50 parts by weight of acrylonitrile were copolymerized according to the procedures of example 1. The product was dissolved, 20 parts by weight in 100 parts dimethylformamide, sensitized, coated and dried according to the procedures of example 2. A diffuse density of 0.35 and a good exposure latitude was obtained exposing to ultraviolet light and developing at 120° C.

Example 6

To polyalphachloroacrylonitrile solution in butanone, 10 percent on a dry weight basis of dimethylaminobenzene diazonium chloride (zinc chloride salt) was added as a solution to give a clear coating solution which was coated and dried as in example 2. When the ultraviolet exposure was developed at 120° C. a diffuse density of 0.24 was obtained and good image gradations were obtained through an exposure brightness range exceeding ten fold. When the development was made at 160° C. the diffuse density was essentially the same and the exposure range was exactly the same.

Example 7

To 3 parts by weight of polyalphachloroacrylonitrile in 12 parts butanone were added 1 part of cellulose acetate having acetyl content of 40 percent in 4 parts butanone and then 0.4 parts dimethylaminobenzene diazonium chloride (zinc chloride salt) in butyrolactone to give a fluid solution which was coated as in example 2 on a polyester film base. After drying, the film was exposed imagewise, by modulating the emission from a black light fluorescent tube with a conventional step wedge. Immediately after the 80 seconds of ultraviolet exposure, the film was exposed overall to a single flash from a General Electric 200 watt-second lamp the film being about 3 inches from the flash tube and at the edge of a polished reflector. An image developed during the course of the 1/1500-second flash being a direct positive copy of the step wedge and having a maximum diffuse density of 0.85 and a minimum density in clear areas of 0.07.

Example 8

To 89 parts by weight polyalphachloroacrylonitrile in 540 parts butanone were added with vigorous stirring 11 parts of polymethylstyrene and 10 parts of dimethylaminobenzene diazonium chloride (zinc chloride salt) in butyrolactone. This solution was coated through a 4-mil nip onto a black kraft paper and dried with a temperature profile from 70° to 115° C. It was exposed to a pattern of ultraviolet light and developed for one-half second at 110° C. This gave a positive hard copy having a pleasing black to white contrast ratio when viewed by reflecting light.

Example 9

To 91 parts by weight polyalphachloroacrylonitrile were added 9 parts polyvinylidene chloride/acrylonitrile copolymer (Saran F120), each as a 20 percent solution in butanone, and subsequently sensitized with 10 parts dimethylaminobenzene diazonium chloride (zinc chloride salt) coated and dried as in Example 2. After an image defining exposure of 40 seconds in front of a 100-watt black light fluorescent tube, the latent image of selectively released nitrogen was allowed to diffuse away before the film was reexposed overall for 40 seconds to the same light source and developed for one-half second at 110° C. The image was not a direct positive having a diffuse maximum density of 0.60 and a minimum background density of 0.08.

Example 10

To 67 parts of polychloroacrylonitrile in 400 parts butanone were added 33 parts of polymethylmethacrylate (83 parts of a commercial solution, Acryloid 101 sold by Rohm and Haas Company) and 10 parts of dimethylaminobenzene diazonium chloride (zinc chloride salt) in butyrolactone, coated, dried, exposed and developed as in example 2. This gave a negative copy with a diffuse maximum density of 0.29 and a background density (diffuse) of 0.06. The preceding description has included specific descriptions and preferred embodiments of the invention but it should be understood that many variations are possible and that this invention includes all modifications and equivalents which fall within the scope of the appended claims.

What is claimed is:

1. A record-furnishing material capable of furnishing a record solely in the form of a distribution pattern of radiation scattering discontinuities formed within a thermoplastic hydrophobic film, the polymeric component of said film being essentially a water insoluble polymer selected from a group consisting of homopolymers of alphachloroacrylonitrile, copolymers of alphachloroacrylonitrile with a different vinyl monomer in which the amount of said vinyl monomer being used is less than 50 percent molar weight as based on the total molar weight of the monomers used to make the copolymer, homopoly of alphachloroacrylonitrile in intimate mixture with polymeric organic material which is compatible with said polymer so that said film is optically substantially clear and copolymers of alphachloroacrylonitrile with a different vinyl monomer in which the amount of said vinyl monomer being used is less than 50 percent molar weight as based on the total molar weight of the monomers used to make the copolymer in intimate mixture with polymeric organic material which is compatible, and a light decomposable solid agent substantially uniformly dispersed therein, said agent upon exposure to light decomposing into products which solely upon warming are volatile to form said radiation scattering discontinuities only in the light struck areas in said polymer to furnish thereby said record.

2. A material according to claim 1 wherein said light decomposable solid agent is a diazo compound capable of generating nitrogen upon exposure to radiation.

3. A material according to claim 1 wherein said polymeric component is essentially one of the indicated alphachloroacrylonitrile homopolymers or copolymers in intimate mixture with polymeric organic material, and said organic material is one chosen from the group consisting of cellulose acetate, polyalphamethylstyrene, polyvinylidene chloride acrylonitrile copolymer and polymethylmethacrylate.

4. A material according to claim 1 wherein the said organic material is present to an extent less than 50 percent by weight as based on the total weight of the said polymeric components.

5. A material according to claim 1 wherein a copolymer of alphachloroacrylonitrile and a different vinyl monomer chosen from the group consisting of styrene, vinyl toluene, alphamethylstyrene and acrylonitrile is used in said film.

6. A material according to claim 3 wherein said polymeric component comprises approximately 75 parts polyalphachloroacrylonitrile in intimate mixture with 25 parts by weight cellulose acetate.

7. A material according to claim 3 wherein said polymeric component comprises approximately 91 parts polyalphachloroacrylonitrile by weight in intimate mixture with 9 parts by weight polyvinylidene chloride acrylonitrile copolymer.

8. A material according to claim 1 wherein said polymeric component is alphachloroacrylonitrile homopolymer.

9. A method of preparing vesicular images which comprises irradiating imagewise a light-sensitive record-furnishing material of claim 1 with actinic light and thereafter heating said record-furnishing material to develop a vesicular image.

* * * * *